United States Patent [19]

Propst

[11] 4,273,168

[45] Jun. 16, 1981

[54] APPARATUS AND METHOD FOR HARVESTING TREES

[76] Inventor: Robert L. Propst, 4141-145th Ave. NE., Bellevue, Wash. 98007

[21] Appl. No.: 78,649

[22] Filed: Sep. 24, 1979

[51] Int. Cl.³ .............................................. A01G 23/08
[52] U.S. Cl. .................................. 144/3 D; 144/2 Z; 144/34 R; 144/309 AC
[58] Field of Search .................... 144/2 Z, 3 D, 34 R, 144/309 AC; 83/928

[56] References Cited

U.S. PATENT DOCUMENTS

| | | | |
|---|---|---|---|
| 3,140,736 | 7/1964 | Propst | 144/3 D |
| 3,974,866 | 8/1976 | Saarenketo | 144/3 D |
| 3,979,075 | 9/1976 | Heron | 144/34 R |

FOREIGN PATENT DOCUMENTS 163836  7/1964  U.S.S.R. ................................. 144/3 D

*Primary Examiner*—W. D. Bray

*Attorney, Agent, or Firm*—Olsen and Stephenson

[57] ABSTRACT

An apparatus and method for converting standing trees to bolt length logs in which a tree-severing unit is mounted on a vehicle having an upright mast assembly extending upwardly from the severing unit. Tree-gripping and feeding assemblies are mounted on the mast and are operable to grip a severed tree and drive it downwardly. A tree cutoff unit is located below the gripping and feeding assemblies and is positioned above the severing unit a predetermined distance corresponding to the bolt length. Tree-delivery assemblies support and drive a severed tree rearwardly into engagement with the cutoff unit to first remove a bolt log from the lower end of the severed tree. The gripping and feeding assemblies are then operated to drive the remainder of the tree downwardly past a tree cutoff means on the mast assembly which cuts additional bolt length logs from the lower end of the tree. A conveyor removes the logs to a storage area on the vehicle.

11 Claims, 7 Drawing Figures

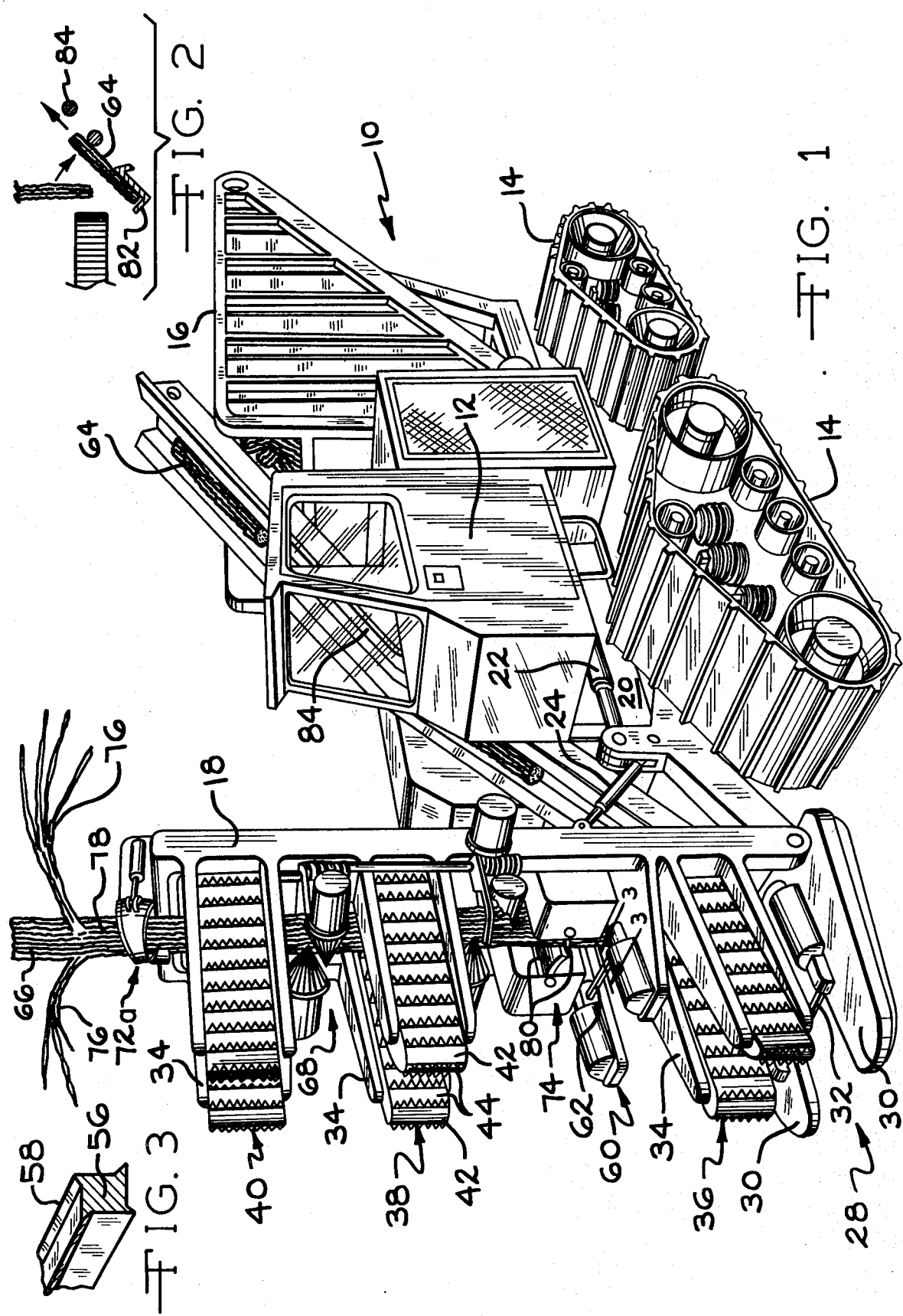

APPARATUS AND METHOD FOR HARVESTING TREES

BACKGROUND OF THE INVENTION

It is known that large stands of timber, principally pine trees, cannot be efficiently used because equipment capable of rapidly and efficiently harvesting these trees is not available. Applicant has made earlier attempts to develop machines for harvesting these trees. Applicant's earlier U.S. Pat. Nos. 3,140,736 and 3,797,540 are examples of machines for harvesting these trees. The present invention provides an improved machine and method for converting such trees to logs.

SUMMARY OF THE INVENTION

The apparatus of this invention includes a tree-severing unit for separating a tree from the earth, a tree cutoff unit disposed above the severing unit a distance corresponding to the bolt length into which the tree is to be cut, and tree-delivery means operable to move the severed tree rearwardly past the tree cutoff unit so that the cutoff unit can cut a bolt length from the lower end of the tree. Tree-gripping and feeding assemblies then grip the remainder of the tree and drive it downwardly past a cutoff unit and past a delimber mechanism. This provides for delimbing of the tree and cutting of the remainder of the tree into bolt lengths by the lower cutoff assembly. A conveyor takes the cutoff bolt lengths and moves them to a storage receptacle on the vehicle.

The method of this invention involves the abovedescribed steps which enables continuous harvesting and a simplification of the entire harvesting process. For example, in the machine shown in applicant's prior U.S. Pat. No. 3,140,736, a second tree cannot be severed while the first tree is being harvested. The apparatus shown in applicant's prior U.S. Pat. No. 3,797,540 requires a carousel mechanism to enable processing of one tree while a second tree is being severed.

According to the present invention, continuous processing is accomplished without the necessity for complex apparatus for handling one tree while a second is being severed.

Further objects, features, and advantages of this invention will become apparent from a consideration of the following description, the appended claims, and the accompanying drawing in which:

FIG. 1 is a perspective view of the apparatus of this invention;

FIG. 2 is a diagrammatic view of the inlet end of the conveyor apparatus in the timber harvester of this invention;

Figure 4:
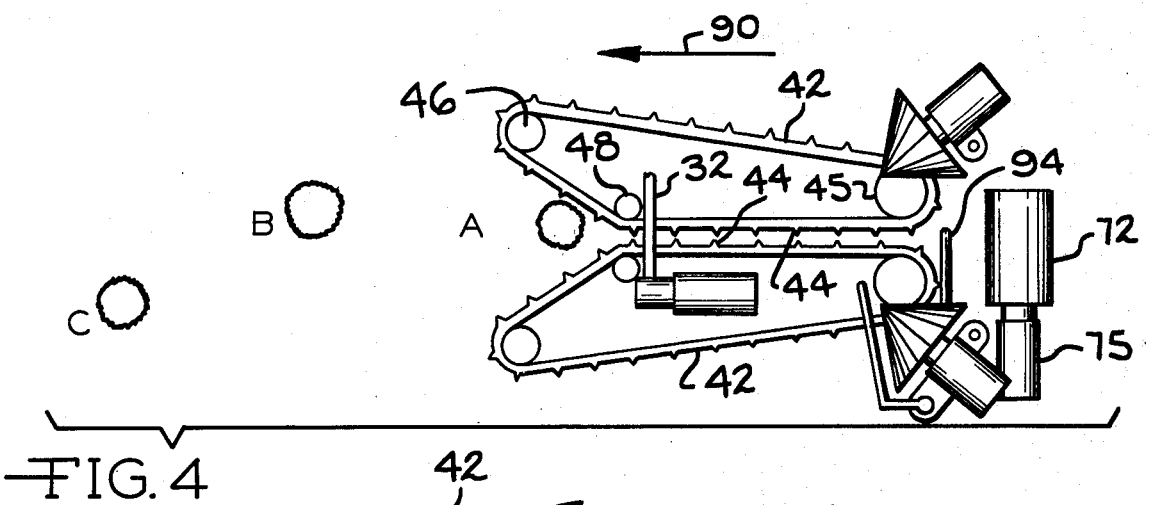

FIG. 3 is a fragmentary perspective view of the cutting element in the tree cutoff unit which forms a part of the apparatus of this invention; and FIGS. 4, 5, 6, and 7 are somewhat diagrammatic plan views illustrating the movement of the harvesting apparatus of this invention with respect to several trees to be harvested and the successive actions of the harvester components in converting the trees to bolt length logs.

With reference to the drawing, the tree-harvesting apparatus of this invention, indicated generally at 10, is illustrated in FIG. 1 as consisting of a vehicle 12 equipped with suitable ground-engaging drive means to enable it to operate on hilly and swampy terrain, such as the endless ground tracks 14. A log storage container 16 is mounted on the rear end of the vehicle 10 and an upright frame or mast assembly 18 is mounted on the vehicle front end. The vehicle 12 includes a frame 20 and hydraulic cylinder assembles 22 and 24 mounted on the frame and connected, either directly or indirectly, to the mast assembly 18 for adjusting the position of the mast assembly between vertical and slightly inclined positions to align the mast assembly 18 with the tree to be harvested and to lower the mast assembly 18 for transport purposes.

A tree-severing unit 28 is mounted on the lower end of the mast assembly 18 and includes a pair of transversely spaced tree guide members 30 and a driven tree-severing bar 32 operable to cut a tree to be harvested off at or near the ground surface. The mast assembly 18 has three pairs of forwardly extending frame fingers 34 which support three vertically spaced tree-gripping and driving assemblies 36, 38, and 40. The assemblies 36, 38, and 40 are substantially identical so only one of the assemblies will be described in detail.

The assembly 38 consists of a pair of endless drive members 42 in the form of belts, chains, or the like having tree-gripping projections 44 which, during a portion of their travel, extend toward each other for gripping a tree between the members 42. Each of the members 42 is mounted for travel in an endless path about a drive roller 45 and idler rollers 46 and 48, all of which are movably mounted so that the members 42 can float between the positions illustrated in FIGS. 4–7, inclusive.

The tree-severing bar 32 is driven by a drive unit 50 (FIG. 7) which includes a drive member 52 movable rearwardly against a spring 54 so as to cushion the impact of the rotating tool 32 on a tree to be severed. The resilient mounting of the cutter 32 enables the vehicle 12 to keep moving forward at a normal harvesting speed during severing. When a tree has been severed by the tool 32, illustrated in FIG. 3 as consisting of a rotatable shaft 56 formed with integral radially outwardly projecting cutting teeth 58, the assemblies 34, 38, and 40 drive the severed tree into engagement with the first bolt cutoff unit 60. The unit 60 is similar to the severing unit 32 in that it includes a yieldably mounted rotating cutter bar 62 similar to the shaft 56 (FIG. 3).

The cutoff unit 60 functions to cut off a bolt length log, such as shown at 64 in FIG. 1, from the lower end of the severed tree. The lower bolt 64 and the remainder of the tree, indicated at 66 in FIG. 1, continue to be moved rearwardly by the feeding and driving assemblies 36, 38, and 40. The lower bolt 64 is delivered to the container 16 and the tree remainder 66 is engaged and gripped by a tree-gripping and feeding assembly indicated generally at 68. The assembly 68 includes a pair of tapered drive rolls 70 and an endless drive chain 72 driven by a motor unit 75 and described in greater detail in the aforementioned patent 3,797,540.

The drive rolls 70 and the drive chain 72 are operable to drive the tree remainder 66 downwardly past a delimber assembly 72a and a lower cutoff unit 74. The delimber assembly 72a operates to remove limbs such as those indicated at 76 in FIG. 1 from the tree trunk 78. The cutoff unit 74 has a pair of rotating knives 80, described in greater detail in the aforementioned U.S. Pat. No. 3,797,540, which operate to cut bolt length logs 64 from the lower end of the tree trunk 78. Such a bolt length log 64 is shown in FIG. 2, and when the lower end of the log hits a generally V-shape plate 82 disposed immediately below the tree trunk 78, the log 64 falls rearwardly onto a conveyor 84 which extends upwardly and rearwardly and functions to deposit the bolt length logs 64 in the container 16.

In the operation of the harvester 10, assume that the vehicle 12 is moving forwardly, in the direction of the arrow 90 in FIG. 4, for the purpose of harvesting the trees indicated at A, B, and C in FIG. 4. The vehicle 12 is driven to a position in which the tree A is positioned between the tree guide members 30 and between the inwardly converging drive assemblies 42 for the tree-gripping and driving assembly 36. Further forward movement of the vehicle 12, which is continuously moved forwardly during this process, moves the cutter element 32 through the base of the tree at a location adjacent the ground. The resilient mounting of the cutter element 32 enables this severing action to take place without impeding the forward movement of the vehicle 12.

Figure 5:
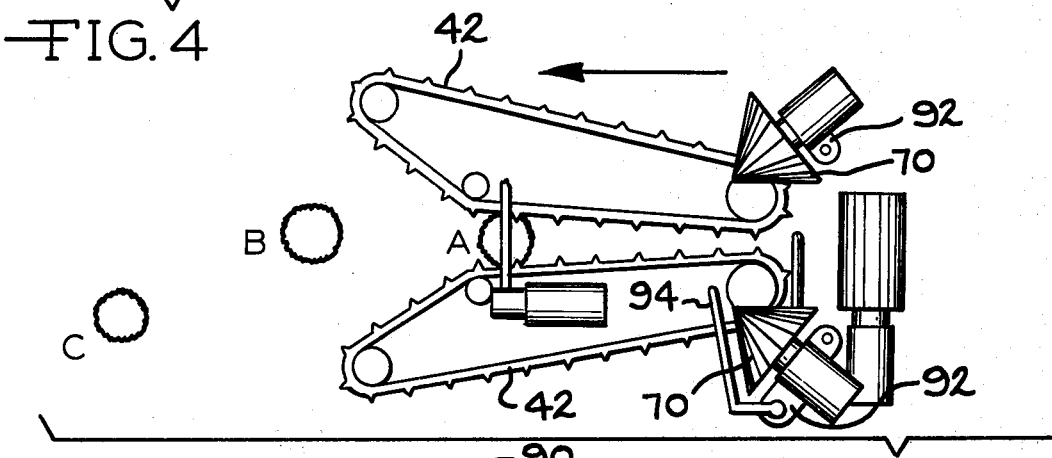

As shown in FIG. 5, during severing of the tree A by the cutter element 32, the endless drive assemblies 42 move apart a distance sufficient to accept the tree A therebetween. This floating movement of the drive assemblies 42 enables the assemblies to adapt to trees of different diameters.

Figure 6:
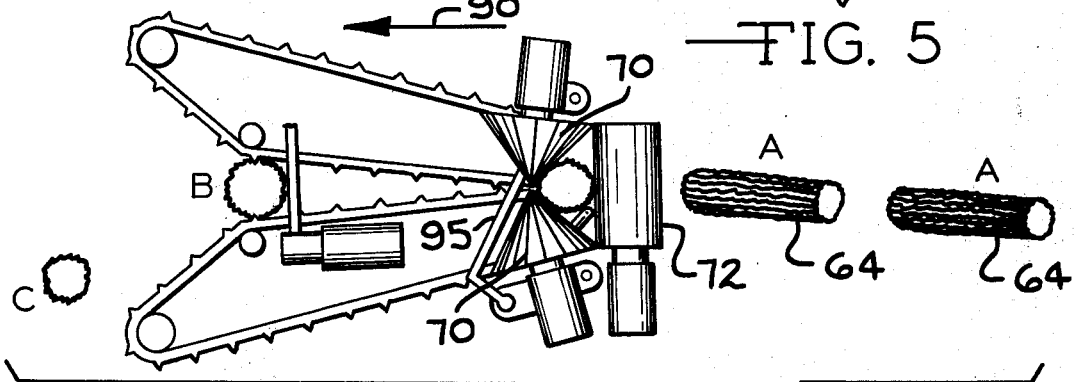

As the vehicle 12 is being driven forwardly to harvest the next tree B, the endless drive members 42 advance the severed tree rearwardly, as shown in FIGS. 5 and 6 into a position between the gripping and feeding rollers 70 and the drive chain 72. As shown in FIG. 5, the rollers 70 are mounted on movable supports 92 which allow the rollers to be moved between the open positions shown in FIG. 5, in which a tree can move rearwardly therebetween, and the closed positions shown in FIG. 6. When the rearwardly moving tree A engages a lever 94 at the rear ends of the endless drive assemblies 42, the lever 94 is moved rearwardly to signal the rollers 70 to move from their open position shown in FIG. 5 to their closed positions shown in FIG. 6.

When the rollers 70 are in their closed positions illustrated in FIG. 6, the tree A is clamped between the rollers 70 and the drive chain 72, both of which are operated so as to drive the tree 66 downwardly at a rapid rate past the lower cutoff unit 74. As the tree moves downwardly past the unit 74, the blades 80 operate to cut the tree into the bolt lengths 64 illustrated in FIGS. 1, 2, and 6. Concurrently, the delimbing apparatus 72 is operating to remove the limbs 76 from the tree.

During the conversion of the tree remainder 66 into the bolt length logs 64, the vehicle 12 is continuing to move in the forward direction 90 to harvest the tree B. Also, while the tree A is being converted into bolt length logs 64, a control unit 95, mounted on the support for one of the drive rollers 70, prevents the next tree B from being moved by the drive belts 42 into engagement with the back side of the rollers 70 by momentarily stopping the rearward delivering motion of endless drives 42.

Figure 7:
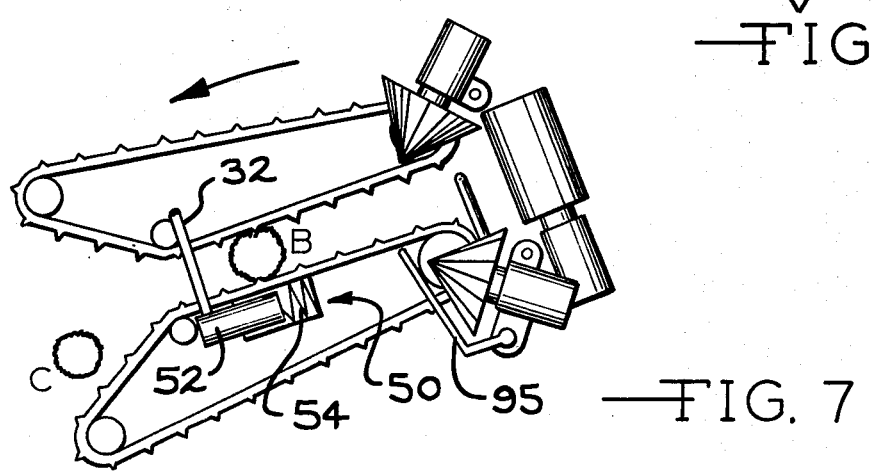

As shown in FIGS. 6 and 7, the tree B is then harvested in the same manner as that described above for the tree A while the harvester is continuing to move forward toward the tree C for the purpose of severing the tree C and subsequently converting it into bolt length logs 64. This sequence is then repeated over and over again, and the container 16 is periodically empied to make room for more bolt length logs 64. The method and apparatus of this invention thus provide for the efficient harvesting of trees and the conversion of those trees into bolt length logs 64 which can be used for a variety of purposes.

I claim:

1. A timber harvesting machine for converting standing trees to bolt length logs comprising a vehicle frame having a front end, a tree-severing unit on said frame front end, an upright mast assembly on said frame extending upwardly from said severing unit, tree-gripping and feeding means mounted on said mast assembly operable to drive a gripped tree downwardly, a tree cutoff unit disposed below said gripping and feeding assembly and spaced above said severing unit a predetermined distance corresponding substantially to said bolt length, tree-delivery means operable to support and drive a severed tree rearwardly into engagement with said cutoff unit so as to sever a bolt length log from the lower end of said severed tree, and tree cutoff means on said mast assembly located rearwardly of said cutoff unit and below said tree-gripping and feeding means operable to cut additional bolt length logs from the lower end of said tree as said tree-gripping and feeding means is operated to move said tree downwardly.

2. A timber harvesting machine according to claim 1 wherein said tree-delivery means includes a plurality of tree-gripping and driving assemblies each of which comprises endless members arranged in vertically spaced pairs, the members in each pair being spaced apart in a horizontal direction and including tree-gripping means on said endless members which extend toward each other to grip a tree disposed between said endless members.

3. A timber harvesting machine according to claim 2 wherein said endless members in each pair are yieldably mounted on said mast assembly for movement toward and away from each other to accommodate trees of varying sizes therebetween.

4. A timber harvesting machine according to claim 1 wherein said tree cutoff unit comprises a substantially horizontal rod-like member rotatable about its own substantially horizontal axis and having cutting elements on the outer surface thereof.

5. A timber harvesting machine according to claim 4 further including an inclined conveyor for bolt length logs supported on said frame rearwardly of said mast assembly, said conveyor having its inlet end located below said tree-gripping and feeding means and rearwardly of said tree cutoff unit, said conveyor being inclined upwardly and rearwardly from said inlet end.

6. A self-propelled timber harvesting machine for converting standing trees to bolt length logs comprising a vehicle frame having a front end engine means on said frame for driving said frame forwardly, an upright mast assembly on the front end of said frame, a tree-severing unit at the lower end of said mast assembly, tree-gripping and feeding means mounted on said mast assembly adjacent the upper portion thereon and operable to drive a gripped tree downwardly, a tree cutoff unit disposed below said gripping and feeding assembly and spaced above said severing unit a predetermined distance corresponding substantially to said bolt length, tree-delivery means comprising a plurality of tree-gripping and driving assemblies operable to support and drive a severed tree rearwardly into engagement with said cutoff unit so as to sever a bolt length log from the lower end of said severed tree, tree cutoff means on said mast assembly located rearwardly of said cutoff unit and below said tree-gripping and feeding means operable to cut additional bolt length logs from the lower end of said tree as said tree-gripping and feeding means is operated to move said tree downwardly, log storage means on said frame, and conveyor means for bolt length logs supported on said frame rearwardly of said mast assembly, said conveyor means having its inlet end located rearwardly of said tree cutoff unit and being operable to convey logs from said cutoff unit to said log storage means.

7. A timber harvesting machine according to claim 6 wherein said tree-gripping and driving assemblies comprise endless members arranged in vertically spaced pairs, the members in each pair being spaced apart in a horizontal direction and including tree-gripping means on said endless members which extend toward each other to grip a tree disposed between said endless members.

8. A timber harvesting machine according to claim 7 wherein said endless members in each pair are yieldably mounted on said mast assembly for movement toward and away from each other to accommodate trees of varying sizes therebetween.

9. A timber harvesting machine according to claim 8 wherein said tree cutoff unit comprises a substantially horizontal rod-like member rotatable about its own axis and having cutting elements on the outer surface thereof.

10. A method for converting standing trees to bolt length logs comprising the steps of severing a tree from the ground, thereafter maintaining the severed tree in an upright position and successively:
(a) moving the upright tree in a generally horizontal direction past a cut-off unit so as to cut a first bolt length log from the lower end of the tree and moving the thus cut first log to one side of the remainder of the tree;
(b) gripping the tree remainder and moving it mechanically downwardly;
(c) removing limbs from the tree remainder during the downward movement thereof; and
(d) cutting as many additional bolt length logs from the lower end of said tree remainder as possible during downward movement of the tree remainder.

11. The method according to claim 9 further including the steps of conveying said logs to a location spaced from said tree remainder and storing said logs at said location.

* * * * *